Figure 1:
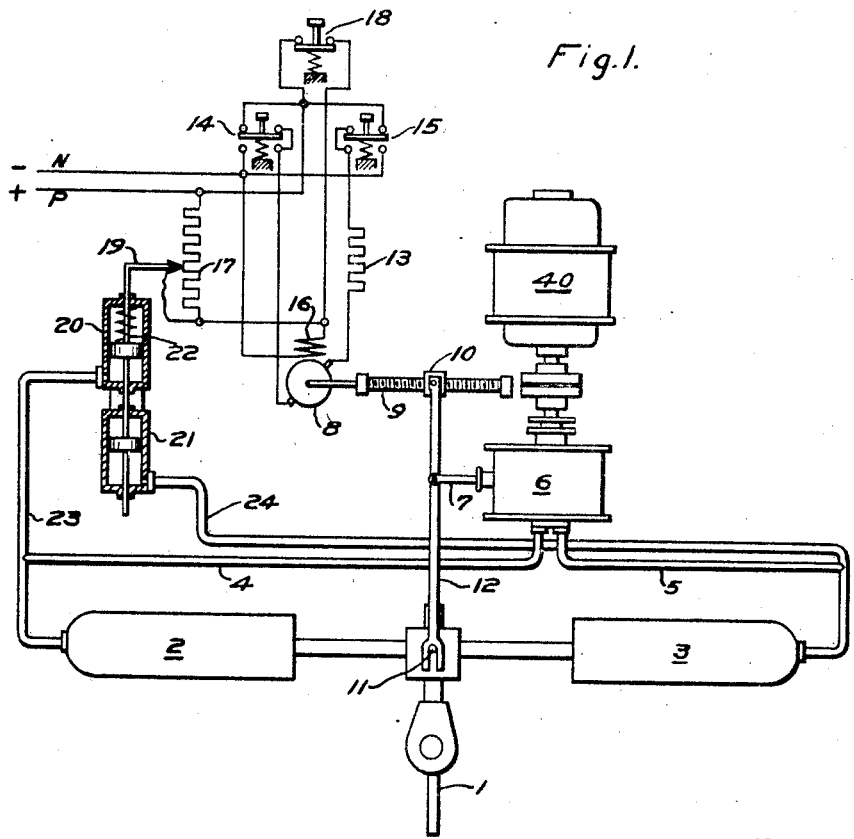

Dec. 8, 1931. J. BAHL 1,835,453
RUDDER CONTROL FOR SHIPS
Filed May 31, 1930

INVENTOR
Johannes Bahl
BY
ATTORNEY

Patented Dec. 8, 1931

1,835,453

UNITED STATES PATENT OFFICE

JOHANNES BAHL, OF BERLIN-CHARLOTTENBURG, GERMANY, ASSIGNOR TO WESTINGHOUSE ELECTRIC & MANUFACTURING COMPANY, A CORPORATION OF PENNSYLVANIA

RUDDER CONTROL FOR SHIPS

Application filed May 31, 1930, Serial No. 457,965, and in Germany June 20, 1929.

My invention relates to means for producing a predetermined movement of a device to be operated at a distant point by the operation of means located at a central control station. More particularly, the invention relates to a steering control system for vessels and dirigibles, wherein the rate of angular movement of the rudder is kept within such limits that the power demand on the central power station never exceeds a predetermined amount.

Rudder-control systems for ships are usually so constructed that a movement of the rudder is initiated by an operation of a regulating member which operates to control the motor driving the rudder. A predetermined operation of the regulating member from a given initial position causes the rudder to move a proportional amount, and the movement of the rudder causes movement of the regulating member to its given initial position. In this manner, for example, in steam steering gears, the slide valve, in electrical steering gears, the starter of the rudder motor, and, in electro-hydraulic systems, the pump stroke, respectively, are adjusted.

In many cases, it is necessary to effect the adjustment by means of an electric motor, a telemotor, controlled from the navigation bridge. This motor determines the extent and rate of movement of the rudder, since, by its controlling effect, it causes the rudder motor to run at a speed that is proportional to that of the telemotor.

If it is desired to shift the rudder at different speeds, to effect such operations as small rudder movements slowly or large rudder movements rapidly or vice versa, then a telemotor which may be operated at the desired speeds is provided. The speed regulation of the telemotor may be effected by the use of resistors connected in the desired combinations, but such method has the disadvantage that the speed is dependent, not only on the resistors in the circuit, but also upon the torque demand on the motor. Furthermore, the desired remote control by the use of resistors requires a rather complicated control equipment.

Another known means for such speed regulation is the Ward-Leonard system of control, wherein the telemotor is supplied with electric energy from a small constant-speed generator, the excitation of which is regulated by a control switch. The Ward-Leonard system requires two motors and a generator instead of one telemotor and, in consequence, is heavy, takes up considerable room and is expensive.

An object of my invention is to utilize the rudder pressure to control the movements of the rudder of a ship or dirigible.

A more specific object of my invention is the provision of field regulation for a telemotor which shall be responsive to the load on the rudder motor.

This arrangement, like the Ward-Leonard control system, has the advantage that only weak field currents have to be switched. By the present arrangement, it is thus possible to control the speed of the telemotor not only by the manually or automatically operable field regulator, but also in response to the rudder pressure or load on the rudder motor. For greater rudder pressures the telemotor may be caused to operate more slowly and, since the rudder motor operates at a speed proportional to the telemotor, the speed of the rudder motor is slower and the energy demand on the ship power plant is thus correspondingly less. In many cases, where the capacity of the central station or power plant is limited, such reduction of the output required of the rudder motor is of great importance.

Figure 2:
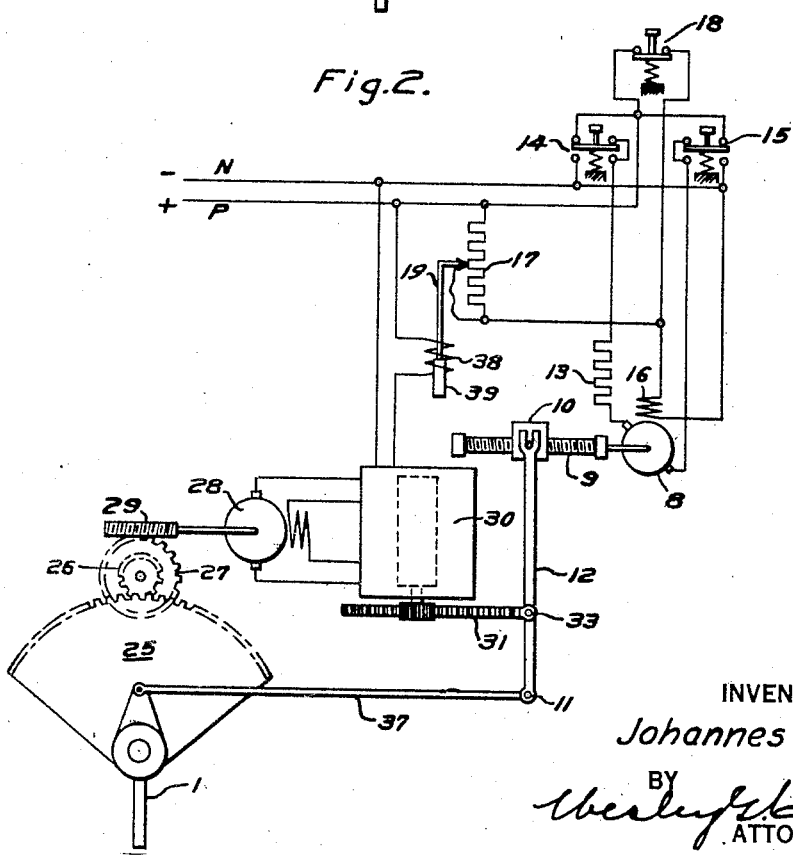

Other objects of my invention will become evident from the following detailed description, taken in conjunction with the accompanying drawings, in which:

Figure 1 shows, schematically, my invention as applied to an electro-hydraulic rudder-control system; while Fig. 2 shows, schematically, a modification of my invention wherein the control is effected by electrical means.

Referring more particularly to Fig. 1 of the drawings, 1 represents the rudder, the movement of which is to be controlled. The rudder 1 is disposed to be moved, in a well known manner, by two pistons mounted in hydraulic cylinders 2 and 3 which receive their actuating liquid through pipes 4 and 5 from a variable stroke pump 6 driven by an electric motor 40. The length of the pump stroke, either in the one or the other direction, to supply liquid to the one or the other of the cylinders 2 or 3, is determined by the position of the rod 7. The position of the rod 7 is, in turn, determined both by the position of the rudder and the position of the rotor of the telemotor 8. Rotation of the telemotor causes operation of the screw-threaded spindle 9, whereas movement of the rudder 1 causes oscillatory movement of pivot pin 11. The movement of pivot pin 11 is accomplished by reason of the fact that it is mounted on a crank-pin mounted eccentric with reference to the axis about which the rudder oscillates.

Mounted upon the threaded stem 9 is a travelling nut 10, to which is pivotally secured a lever 12.

If the telemotor is caused to rotate a predetermined amount in a given direction, the travelling nut 10 is shifted a definite amount, since the lever 12 is caused to move to the right or the left, as the case may be, about pin 11 as a pivot. Such movements of lever 12 shift the position of rod 7 and, in consequence, the stroke of pump 6 is changed so that the pump, being operated by the motor 40, supplies the one or the other of the cylinders 2 and 3 with liquid under pressure. The rudder 1 is thus moved and its movement continues until the pivot pin 11 has been moved far enough to compensate for the original movement of the travelling nut 10, that is, the rudder movement shifts rod 7 to its original position, whereupon the pump stroke is equalized, and the rudder movement ceases. If the rudder is to be further shifted, then the motor 8 must continue to operate, and the speed of the rudder movement is exactly determined by the speed of the telemotor 8, because any leading or lagging of the rudder is compensated by the changing of the pump stroke.

In the armature circuit of the telemotor is provided a starting resistor 13 having a substantially fixed resistance value, to keep the current surges, due to starting of the motor, within permissible or safe limits. The starting resistor is of conventional type and may be controlled by a manual controller or by automatically operated accelerating relays, in a well known manner.

The motor 8 is controlled by push-button switches 14 and 15 which are designed to shunt the armature circuit when in normal position. Assuming, however, that push-button switch 14 is depressed, then a circuit is established from the positive conductor P, through the upper contact members of push-button switch 15, starting resistor 13, the armature of the telemotor 8 and the lower contact members of the push-button switch 14, to the negative line conductor N. Upon actuation of the push button switch 15 to its lower position, the flow of current through the armature is reversed so that operation of the left-hand push-button switch produces movement of the rudder to port whilst operation of the right-hand push-button switch causes movement of the rudder to starboard. When the two push-button switches 14 and 15 are in their normal or upper positions, a dynamic-braking circuit for the armature of the motor extends from one terminal, through the two switches and the resistor 13, to the other terminal of the motor.

The telemotor 8 is a shunt-wound motor having field windings 16 and a field rheostat 17. A push-button switch 18, when in normal or upper position, provides a shunt circuit for the rheostat 17 and thus provides for a field connection directly across the supply lines P and N. When the dynamic-braking circuit is established, since there is a heavy field excitation and a comparatively low resistance in the armature circuit, the motor comes to rest almost instantly when one of the push-button switches 14 and 15 is released from its depressed position.

Aside from the control effect of push-button switch 18, the resistance value of the rheostat 17 is controlled by a slidable contact member 19. The contact member is shifted by two pistons disposed in hydraulic cylinders 20 and 21. The movement of the pistons is restrained by a spring 22. The two cylinders 20 and 21 are connected to the cylinders 2 and 3 for operating the rudder and to the conduits 4 and 5 by two conduits 23 and 24, respectively. Obviously, any difference of pressure developed in the conduits 4 and 5 and, in consequence, of the cylinders 2 and 3, is also transmitted to the cylinders 20 and 21, respectively. By a proper selection of the spring 22 or by the use of an adjustable spring, the contact member 19 may be made to operate over any range, as a function of the load on the rudder motor.

In the preferred embodiment, a spring 22 is selected which will hold the pistons, in the cylinders 20 and 21, in the lowermost positions for all liquid pressures encountered at or below one-half of the maximum rudder-motor-rotor torque. If the pistons are in their lowermost positions, all of the resistor sections of the field rheostat 17 are in series with the field winding. Assuming that one of the push-button switches 14 and 15 is in a depressed position and that push-button switch 18 is also in a depressed position, then speed of the motor 8 will be a maximum, and, in consequence, the angular velocity of the rudder will be a maximum.

During a large rudder motion at a high angular velocity, the rudder is likely to approach a "stiff" position, that is, a position where the torque on the rudder shaft has increased to such extent that the pressure developed in cylinders 2 and 3, in consequence, in cylinders 20 and 21, is sufficient to cause movement of the pistons in cylinders 20 and 21 against the spring 22, the slidable contact member 19 being shifted upwardly along resistor 17 more and more, and the speed of the telemotor being so reduced that further movement of the rudder takes place approximately with constant consumption of power. It is to be noted that this system of control of the telemotor and the rudder motor is also directly influenced by the speed of the ship. When the ship moves at full speed, the torque required to move the rudder is greater than for any speeds less than full speed, and, in consequence, the angular velocity of the rudder will be less, and the power demand on the central station by the rudder motor will be less. From the foregoing, it is obvious that, at full-speed operation, when there is already a heavy demand on the central station, the demand of the rudder motor is small, while, during slower ship speeds, the demand of the rudder motor is larger, so that the power demand on the central station remains substantially constant, regardless of the speed of the ship. This automatic compensation of the angular velocity of the rudder with changes of speed is inherent in the control system, but the important feature of my invention is the fact that the angular velocity of the rudder, when exceeding a predetermined value, may be controlled in response to the torque on the rudder shaft.

For small rudder angles and when the angular velocity is to be small, the push-button switch 18 is permitted to remain in its normal upper position. When the push-button switch 18 is not operated, the field winding 16 is connected directly across the supply lines P and N, and, in consequence, the rudder speed is a minimum, as above explained.

In the modification shown in Fig. 2, the rudder 1 is moved by means of a toothed quadrant 25 engaging a pinion 26 on the shaft on which is mounted a worm wheel 27 in mesh with a worm 29 operated by the rudder motor 28. At 30 is shown a conventional drum controller for controlling the acceleration and speed of the motor 28. Since the controller 30 is of conventional type and, in itself, represents no part of my invention, it is not shown in detail. As shown in the drawings, the rack 31 is actuated by the difference of the movements of the rudder and the telemotor 8 since one of its ends is connected to the lever 12 at pivot point 33. The lever 12, in turn, is actuated by the telemotor 8 through the travelling nut 10 mounted on the threaded spindle 9, while, at its other end 11, it is moved through a link 37 by the rudder 1.

The control of the telemotor 8, in this modification, is similar to that of Fig. 1, except that the slidable contact member 19 for the field rheostat 17 is actuated by a solenoid 38 energized by the current taken by the rudder motor. As soon as a predetermined current is exceeded, the solenoid attracts its iron core or armature 39 and thus operates the slidable contact member 19. It is to be understood that elements 38 and 39 may be designed to function as a time-limit relay so that the contact member 19, when 38 is sufficiently energized, operates after a predetermined interval of time; or, the armature 39 may be provided with an adjustable spring or similar restraining means so that the number of resistor sections in series with the field winding 16 is a direct function of the current demand of the rudder motor.

In this kind of electrical control, it is necessary that the rudder motor be so designed and arranged that it can supply higher torques at lower speeds, which is best effected by employing a regulatable shunt motor. It is, however, also possible to control the rudder motor in a Ward-Leonard system of control, in which arrangement, the field of the generator is only weakly energized when the control lever is moved but a small distance, and, consequently, the generator, in spite of high current strength, will take only a limited power from its drive motor.

In the illustrated example, the control device 30 is indicated as a drum switch having a regulatable shunt motor, which is started with a strong motor field, and a shunt field weakened when the starting operation is completed, whereby the speed of the motor is increased. The movement of the control switch, and thus, the speed of the rudder motor, in the illustrated arrangement, is given by the speed of the telemotor. The more rapidly this motor operates, the more the rack 31 is moved out of its mid-position, and the more rapidly will the rudder motor operate.

Both of the modifications of my invention above discussed show a material reduction in the number of control units required; and the nature of control is such that the central power plant for the ship may be considerably smaller, thus reducing the cost of construction and providing additional valuable cargo space in the ship.

I do not wish to be restricted to the specific structural details, arrangement of parts or circuit connections herein set forth, as various other modifications thereof may be effected without departing from the spirit and scope of my invention. I desire, therefore, that only such limitations shall be imposed as are indicated in the appended claims.

I claim as my invention:

1. A rudder-control system including hydraulic means for operating the rudder, a motor for operating the hydraulic means, a telemotor for controlling the load on the motor, and means for controlling the speed of the telemotor in response to the load on the motor.

2. A control system for the rudder of a ship, comprising a motor for operating the rudder, a telemotor for controlling the speed of the motor, and mechanical means responsive to the rudder torque for controlling the speed of the telemotor.

In testimony whereof, I have hereunto subscribed my name this 8th day of May, 1930.

JOHANNES BAHL.